(12) United States Patent
Hoffman

(10) Patent No.: US 7,712,968 B2
(45) Date of Patent: May 11, 2010

(54) COMPOUND ROLLER BEARING

(75) Inventor: Steve E. Hoffman, Englewood Cliffs, NJ (US)

(73) Assignee: SMH Bearing Holdings, LLC, New York, NY (US)

(*) Notice: Subject to any disclaimer, the term of this patent is extended or adjusted under 35 U.S.C. 154(b) by 1139 days.

(21) Appl. No.: 11/257,899

(22) Filed: Oct. 25, 2005

(65) Prior Publication Data

US 2006/0088236 A1  Apr. 27, 2006

Related U.S. Application Data

(60) Provisional application No. 60/622,351, filed on Oct. 27, 2004.

(51) Int. Cl.
F16C 19/20 (2006.01)
(52) U.S. Cl. ..................................... 384/553
(58) Field of Classification Search ................. 384/553, 384/554, 555, 565; 476/70
See application file for complete search history.

(56) References Cited

U.S. PATENT DOCUMENTS 390,424 A * 10/1888 Wood .......................... 384/555
3,058,788 A * 10/1962 Kaplan ....................... 384/467

* cited by examiner

Primary Examiner—William C Joyce
(74) Attorney, Agent, or Firm—Drinker Biddle & Reath LLP

(57) ABSTRACT

A bearing comprises an inner race defining an inner track, an outer race defining an outer track, and a compound roller assembly interconnecting the inner and outer races for relative rotation between the inner and outer races. The compound roller assembly includes a plurality of first rollers and a plurality of second rollers. The first and second rollers respectively contact the inner track of the inner race and the outer track of the outer race for rolling contact therewith. Each of the first rollers contacts at least one of the second rollers such that the first and second rollers rotate in opposite directions during relative rotation between the inner and outer races.

10 Claims, 4 Drawing Sheets

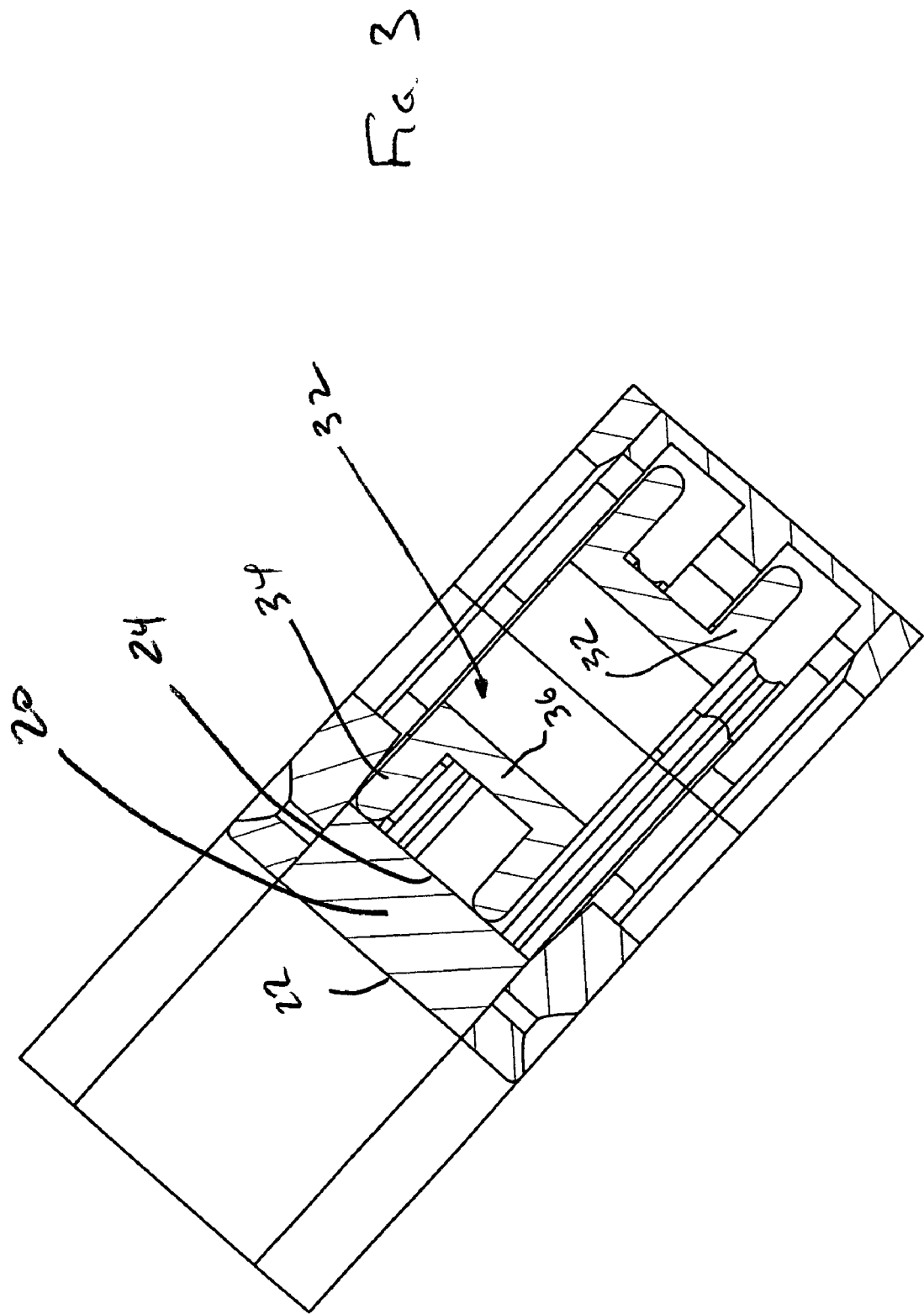

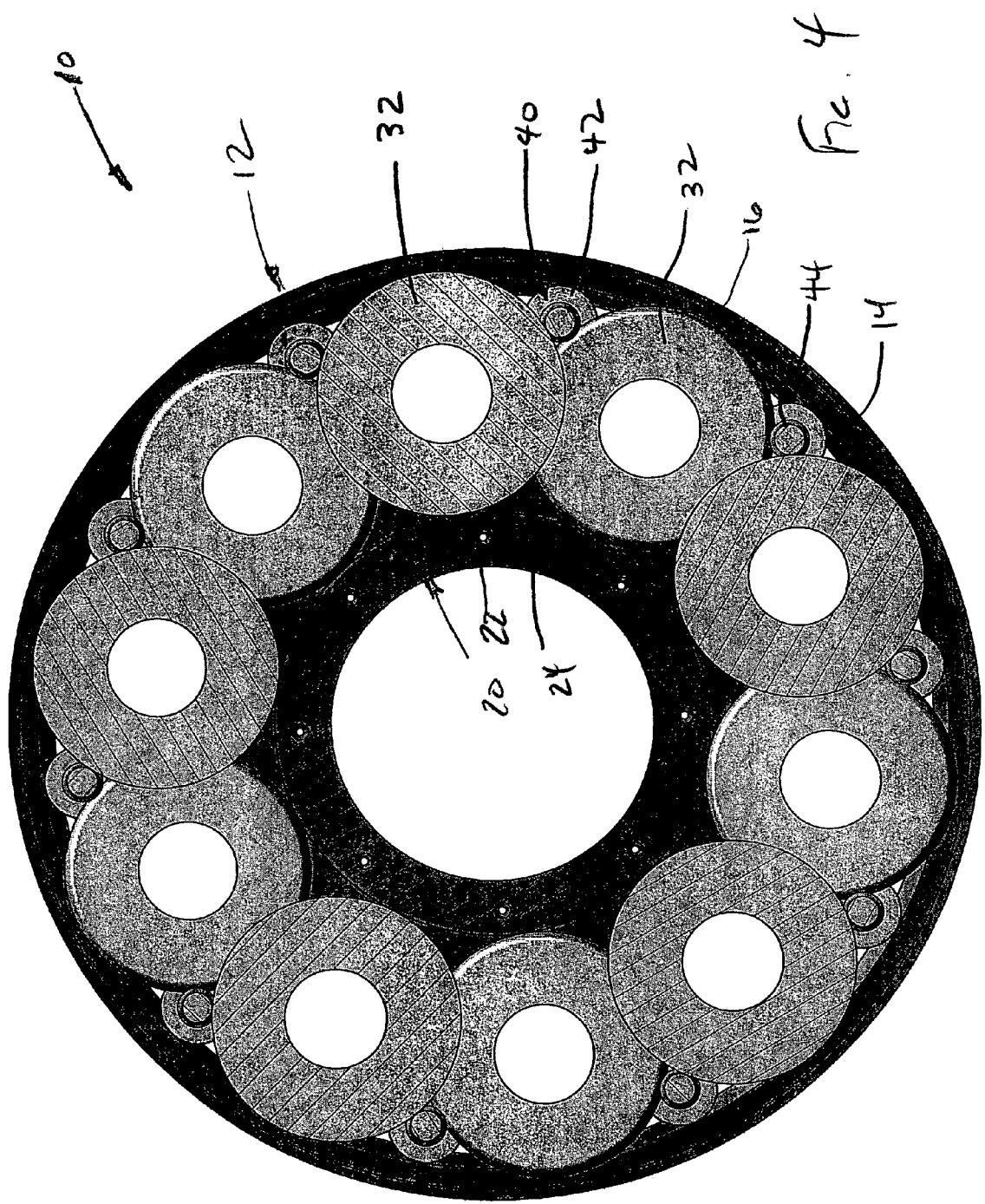

COMPOUND ROLLER BEARING

RELATED APPLICATION

This application is related to and claims priority from U.S. Provisional Application No. 60/622,351, filed Oct. 27, 2004, which is incorporated herein by reference in its entirety.

FIELD OF THE INVENTION

The present invention relates to a bearing assembly.

BACKGROUND OF THE INVENTION

Roller and ball bearings are typically used to provide radial support for a rotating component, such as a drive shaft, while permitting rotational motion. A bearing includes an inner ring, an outer ring, and a plurality of rolling elements located between and in rolling contact with the inner and outer rings.

As with any relative motion between two metal objects, the frictional contact between the rolling element and the rings results in heat. Excessive heat can result in seizing of a bearing. To prevent this, many existing bearing designs reduce the friction between the contacting elements through the use of lubricating grease or oil. This tends to add weight to the bearing.

Another problem with conventional bearing designs is that any looseness between the rolling elements and the rings can result in the development of vibration in the bearing, which reduces the life of the bearing and can lead to noise, especially in enclosed compartments.

A need exists for an improved bearing design that minimizes noise and vibration.

SUMMARY OF THE INVENTION

According to one aspect of the invention, a bearing assembly comprises an inner race defining an inner track, an outer race defining an outer track, and a compound roller assembly interconnecting the inner and outer races for relative rotation between the inner and outer races. The compound roller assembly includes a plurality of first rollers and a plurality of second rollers. The first and second rollers respectively contact the inner track of the inner race and the outer track of the outer race for rolling contact therewith. Each of the first rollers contacts at least one of the second rollers such that the first and second rollers rotate in opposite directions during relative rotation between the inner and outer races.

According to another aspect of the invention, a bearing comprises an inner race, an outer race, and a roller assembly located between the inner and outer races to provide for relative rotation between the inner and outer races. The roller assembly includes a set of first rollers each having at least two annular rings on a central hub. The annular rings of each of the first rollers is offset with respect to the annular rings of at least one adjacently located other one of the first rollers to provide a nested arrangement for the first rollers in which the wheels of the first rollers are interlaced with each other.

Other objects, aspects and advantages of the present invention will become apparent to those skilled in the art upon reading the following detailed description, when considered in conjunction with the appended claims and the accompanying drawings briefly described below.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown. The drawings are not necessarily to scale, emphasis instead being placed on illustrating the principles of the present invention.

FIG. 3 is a section view of the compound roller bearing taken along lines 3-3 in FIG. 1.

FIG. 4 is a section view of the compound roller bearing taken along lines 4-4 in FIG. 2.

DETAILED DESCRIPTION OF THE DRAWINGS

Figure 1:
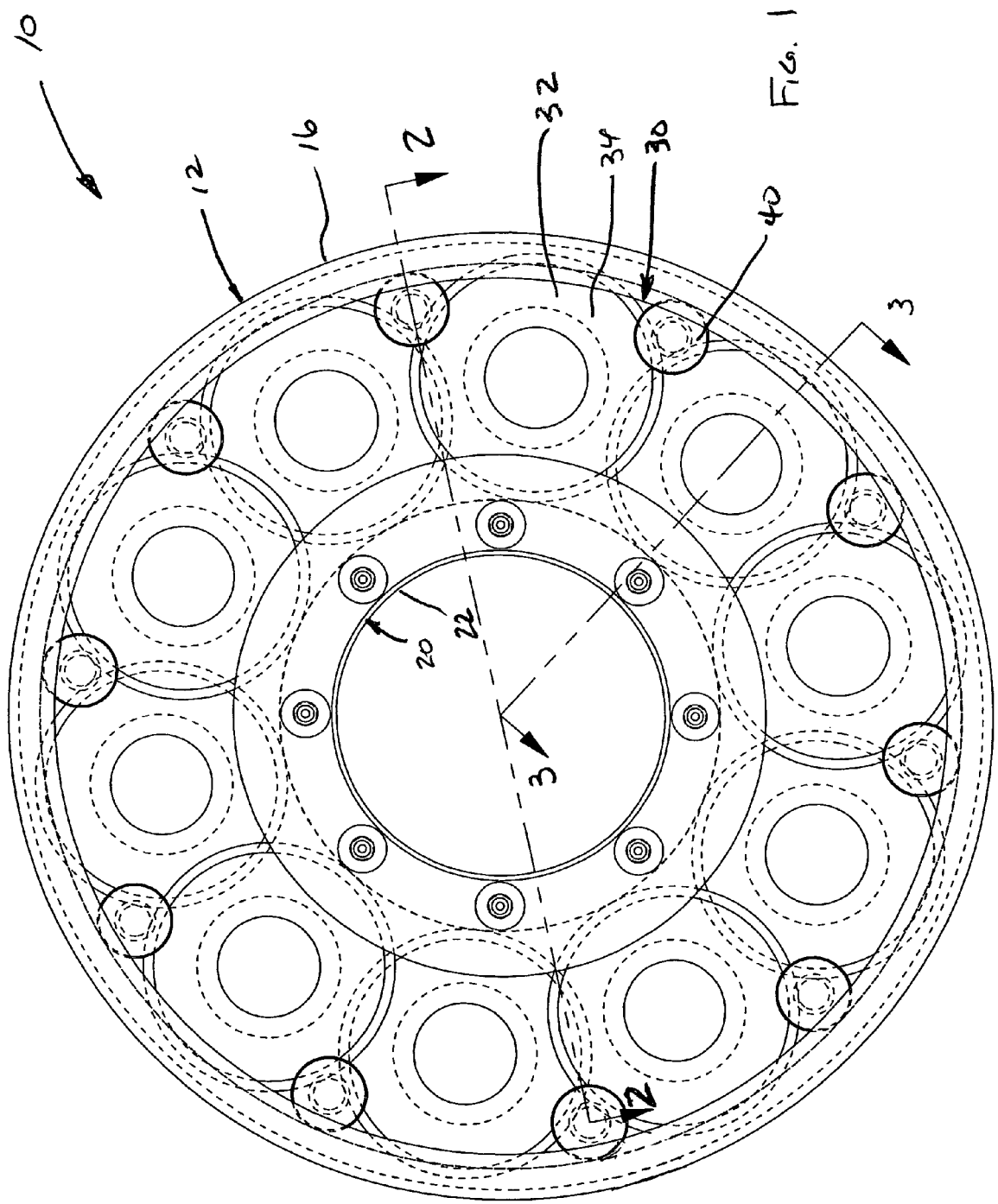
FIG. 1 is a front side view of a compound roller bearing according to the present invention.
Figure 2:
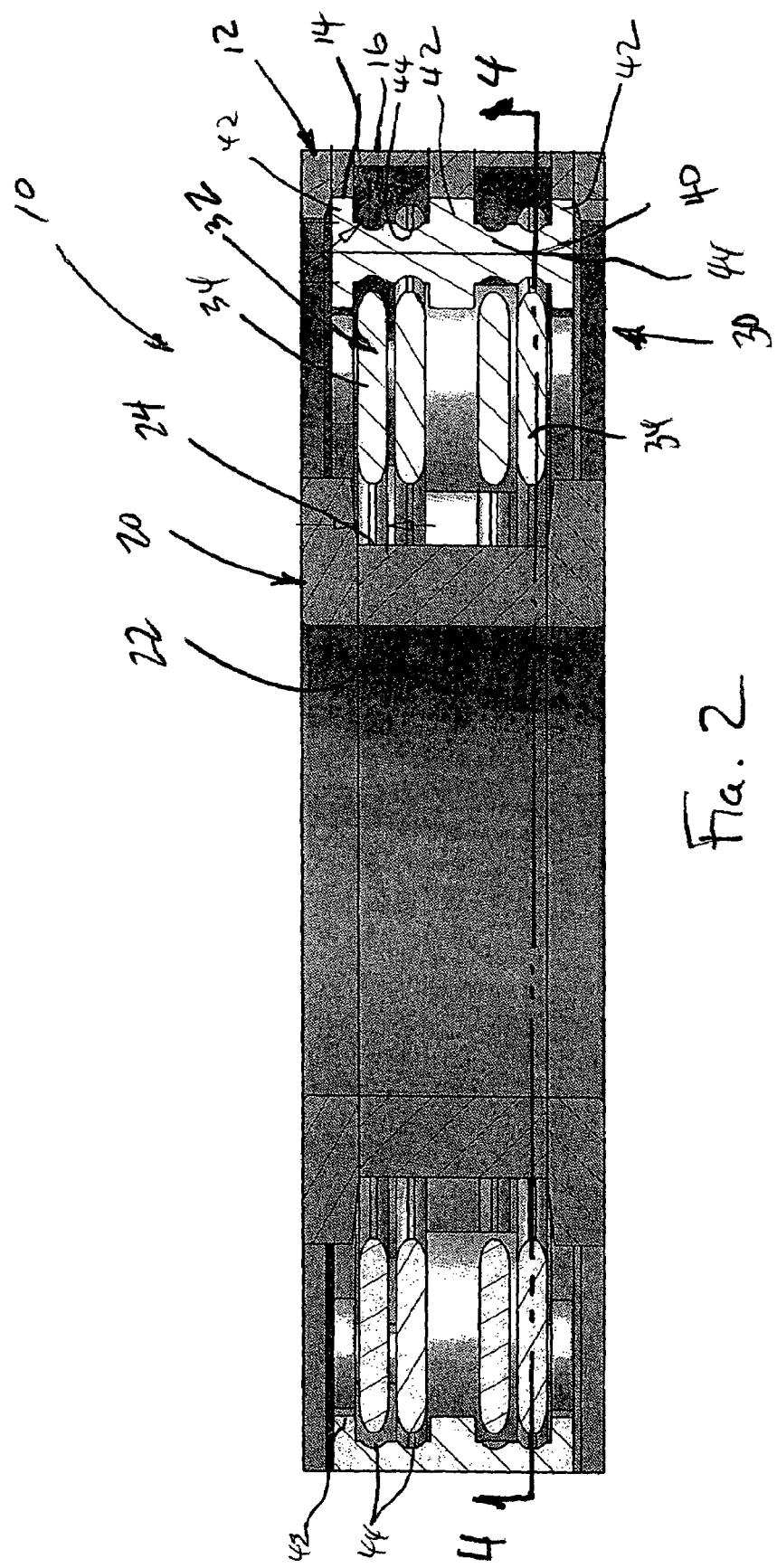
FIG. 2 is a section view of the compound roller bearing taken along lines 2-2 in FIG. 1.

Referring now to the figures wherein like reference numerals correspond to similar elements throughout the views, a presently preferred embodiment of the invention is shown. FIG. 1 is a front view of a compound roller bearing 10 according to the present invention. The roller bearing 10 includes a cylindrical outer ring 12 that includes an outer race 14 formed on an inward facing side of the outer ring 12. As will be discussed in more detail below, the outer race 14 defines an outer track in which or upon which a roller assembly 30 can roll. The outer surface 16 of the outer ring 12 can be configured in any conventional manner.

The compound roller bearing 10 also includes an inner ring 20 that includes a cylindrical inner surface 22 that is sized to receive the rotating component in a conventional manner. The inner ring 20 also includes an inner race 24 that defines an inner track in which or upon which a roller assembly 30 can roll.

The roller assembly 30 includes at least one set of first rollers 32 and one set of second rollers 40. Each set of first rollers 32 includes a plurality of first rollers 32 spaced about and in contact with the circumference of the inner race 24. In the illustrated embodiment, the first rollers 32 include two wheels 34 attached to each other through a hub 36 (see FIG. 3.) The wheels 34 have an outer diameter that is less than the radial distance between the inner race 24 and the outer race 14. While the illustrated embodiment shows two wheels 34 connected by a hub 36, it is also contemplated that each first roller 32 could be a single wheel or a cylindrical roll.

As also shown in the figures, the first rollers 32 are arranged such that the wheels 34 interleave with one another. This permits the use of more first rollers 32 in a roller bearing 10 than if the rollers 32 were arranged side-by-side. The staggering or interleaving also provides for a more balanced loading of the second rollers 40. It should be readily apparent that, while the first rollers 32 are interleaved in the preferred embodiment, it is not necessary that they need to be.

The second rollers 40 include a primary rolling surface 42 and a secondary rolling surface 44. The primary rolling surface 42 has a diameter sized to contact and roll along the outer race 14. The secondary rolling surface 44 has a diameter sized to contact and roll along the outer diameter of the first roller 32. As shown in the figures, the secondary rolling surface 44 preferably defines a recessed groove or tracks having a shape, such as concave, v-shaped or dove tail, for example, that complements the shape of the wheel 34. These tracks act to naturally seat the wheels. Additionally, the tracks also assist in providing resistance during thrust.

As shown, the second roller 40 is located between adjacent first rollers 32. Thus, contact between the inner race 24 and the outer race 14 is not along a radial line but, instead, is offset.

During operation, as the inner ring 20 rotates with the component, the contact between the inner race 24 and the first rollers 32 causes the first rollers 32 to rotate in the opposite direction. The contact between the first rollers 32 and the second rollers 40 causes the second rollers 40 to rotate in a direction opposite the first rollers 32 and to roll along the outer race 14.

In an alternate embodiment, the roller assembly 30 may also include a roll cage (not shown). The roll cage would maintain the position of the first and second rollers. However, it is contemplated that only a single roll cage would be needed that could engage with or otherwise control the position the first rollers 32. Due to the meshing of the first and second rollers 32, 40, the second rollers 40 do not need to be engaged by the cage. Roll cages are well known and, thus do not need to be discussed further.

The components of the compound roller bearing 10 can be made from any conventional bearing materials, including steel, aluminum, and bronze.

As discussed above, the terms "roller" and "roller element" are not limited to cylindrical or wheel components. On the contrary, it is contemplated that the rollers could be spherical balls (i.e., ball bearings) that roll within the races, or could be a combination of cylindrical rods and spherical balls, depending on the loading and the arrangement of the races.

Although the invention has been described and illustrated with respect to the exemplary embodiment thereof, it should be understood by those skilled in the art that the foregoing and various other changes, omissions and additions may be made therein and thereto, without parting from the spirit and scope of the present invention.

What is claimed is:

1. A roller bearing assembly comprising:
an inner race defining an inner track;
an outer race defining an outer track; and
a compound roller assembly interconnecting the inner race and outer race to provide for relative rotation between the inner race and the outer race, the compound roller assembly including a plurality of first rollers and a plurality of second rollers,
the first rollers and second rollers respectively contacting the inner track of the inner race and the outer track of the outer race for rolling contact therewith,
each of the first rollers contacting at least one of the second rollers such that the first and second rollers rotate in opposite directions during relative rotation between the inner race and the outer race;
wherein each of the first rollers includes a plurality of annular wheels supported on a central hub and wherein the wheels of each of the first rollers are offset with respect to the wheels of adjacently located first rollers, the first rollers arranged such that the wheels of each of the first rollers are interlaced with the wheels of adjacently located first rollers.

2. The bearing assembly according to claim 1, wherein the central hub of each of the first rollers comprises a cylinder.

3. The bearing assembly according to claim 1, wherein the central hub of each of the first rollers is offset with respect to the central hub of adjacently located first rollers.

4. The bearing assembly according to claim 1, wherein each of the second rollers includes a concavely curved recess adapted for receipt of the wheels of an adjacently located first roller.

5. A roller bearing comprising:
an inner race;
an outer race; and
a roller assembly located between the inner race and the outer race to provide for relative rotation between the inner race and the outer race,
the roller assembly including a set of first rollers each having at least two rings on a central hub, the rings of each of the first rollers offset with respect to the rings of at least one adjacently located other one of the first rollers to provide a nested arrangement for the first rollers in which the wheels of the first rollers are interlaced with each other;
wherein the roller assembly further includes a set of second rollers each located between a pair of adjacently located first rollers, each of the second rollers defining primary surface adapted for rolling contact with the outer race and a secondary surface adapted for rolling contact with each of the rings of the pair of adjacently located first rollers.

6. The bearing according to claim 5, wherein each of the first rollers includes two rings and wherein the central hub comprises a cylinder.

7. The bearing according to claim 5, wherein the secondary surface of each of the second rollers includes a concavely curved recesses for receipt of the rings of the adjacently located first rollers.

8. The bearing according to claim 5, wherein the inner race and outer race respectively define inner and outer tracks adapted for rolling contact with the first and second rollers.

9. A roller bearing assembly comprising:
an inner race defining an inner track;
an outer race defining an outer track; and
a compound roller assembly interconnecting the inner race and outer race to provide for relative rotation between the inner race and the outer race, the compound roller assembly including a plurality of first rollers and a plurality of second rollers,
the first rollers contacting the inner track of the inner race and being spaced from the outer track of the outer race such that the first rollers are in rolling contact with the inner track, but not the outer track, each first roller being offset with respect to an adjacent first roller such that the first rollers are interlaced with each other about the inner race,
the second rollers each having a roller contacting surface and a track contacting surface, the track contacting surface being in rolling contact with the outer track of the outer race and spaced from the inner track of the inner race such that the track contacting surface of each of the second rollers is in rolling contact with the outer track, but not the inner track,
each of the first rollers being in rolling contact with the roller contacting surfaces of at least two of the second rollers such that the first and second rollers rotate in opposite directions during relative rotation between the inner race and the outer race.

10. A roller bearing assembly according to claim 9 wherein the outer track of the outer race is radially inward from the outermost radial point of the first rollers.

* * * * *